Figures 1, 2:
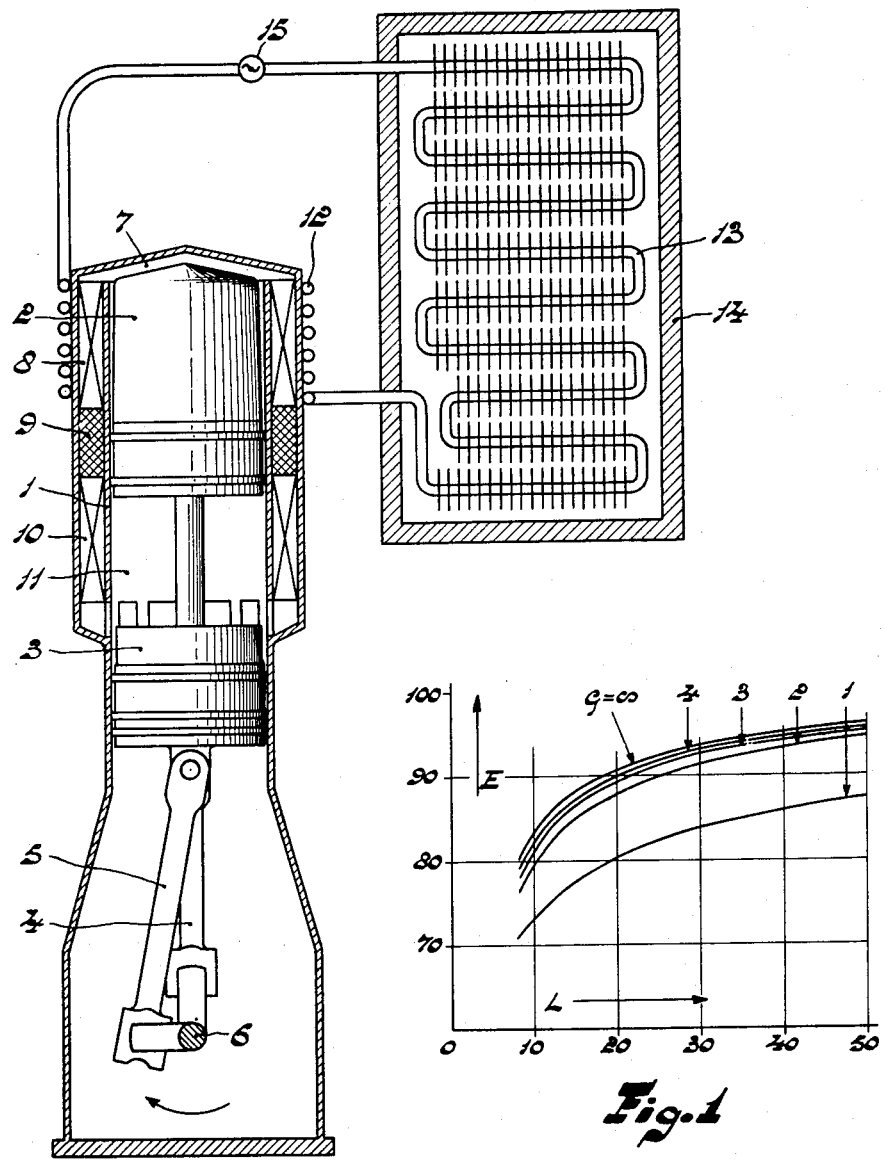

June 19, 1956  J. W. L. KÖHLER ET AL  2,750,765
COLD GAS REFRIGERATOR
Filed April 3, 1952

INVENTORS
Jacob Willem Laurens Köhler
Willem Frederik Schalkwijk
BY
Fred M. Vogel
AGENT United States Patent Office 2,750,765
Patented June 19, 1956

2,750,765

COLD GAS REFRIGERATOR

Jacob Willem Laurens Köhler and Willem Frederik Schalkwijk, Eindhoven, Netherlands, assignors to Hartford National Bank and Trust Company, Hartford, Conn., as trustee Application April 3, 1952, Serial No. 280,278

Claims priority, application Netherlands April 11, 1951

5 Claims. (Cl. 62—136)

This invention relates to improvements in or relating to cold gas refrigerators.

More particularly, this invention relates to a cold gas refrigerator comprising two spatial chambers which vary continuously in volume with a substantially constant relative phase difference, one of said chambers having a lower temperature and the other a higher temperature. The spatial parts are in communication with each other by means of a freezer, a regenerator and a cooler, and contain a gas of invariable chemical composition which performs a closed thermodynamic cycle in which the gas is invariably in the same physical state. Such cold gas refrigerating machines are known per se and are often referred to as refrigerators operating on the reversed hot-gas reciprocating-engine principle.

Although such refrigerators, similarly to the hot gas reciprocating engine, were developed long ago, it has hitherto not been possible to build machines of this type having an economically justified efficiency. This is due in particular to the fact that, as yet, we had an insufficient knowledge of the thermodynamic behaviour of the said machines and that, although it was known that similarly to a hot gas reciprocating engine, and even to a higher extent, the regenerator fulfils a very important function, we nevertheless were not fully aware of the requirements a regenerator for a refrigerator has to satisfy.

If a refrigerator comprises a regenerator which does not meet the requirements it is possible, in contradistinction to refrigerators of other types, to reach very low temperatures from room temperature at one stage, but in this case the cold production is low as a result of the imperfectness of the regenerator.

The object of the invention is to provide means for constructing a cold gas refrigerator capable of cooling from room temperature to a desired temperature at one stage, while at the same time at this temperature, the efficiency of the machine is economically justified.

According to the invention, it is necessary that when the refrigerator is in normal use the regenerator has a $$C_r = f \cdot \frac{k}{k-1} \cdot \frac{P_{mean}}{T_w} \cdot \frac{B_1}{B_2}$$

where $f$ exceeds 0.08, preferably 0.20, and $P_{mean}$ is at least 3 atmospheres absolute, preferably 7 atmospheres absolute.

In this formula:

$C_r$ = the thermal capacity of 1 cc. of the regenerator in gram cal./cc. ° C., at a temperature which is the arithmetic mean of the temperatures of the chamber at a low temperature and the chamber at a higher temperature, both in ° Kelvin.

$P_{mean}$ = the mean pressure in respect of time of the gas in kg./cm.$^2$.

$K$ = the ratio between the specific heat at a constant pressure and the specific heat at a constant volume of the gas at that temperature which is the arithmetic mean of the temperatures of the chamber having a higher temperature.

$B_1$ = the mean total volume in respect of time of the chamber in which the thermodynamic cyclic process takes place, in ccs.

$B_2$ = the mean total volume in respect of time of the chamber in which the thermodynamic cyclic process takes place, in ccs. reduced to the temperature of the chamber having the higher temperature.

$T_w$ = the absolute temperature of the gas in ° Kelvin at the point at which this gas enters the chamber having a lower temperature.

The thermal capacity $C_r$ of 1 cc. of the regenerator is the weight of the regenerator loading mass per cc. regenerator volume multiplied by the specific heat of the material of the regenerator loading mass at the above-mentioned temperature.

According to an alternative embodiment of the invention the normal use of a cold gas refrigerator which is particularly suitable for cooling at one stage from room temperature to temperatures lower than −100° C., $$C_r = f_1 \cdot \frac{k}{k-1} \cdot \frac{P_{mean}}{T_w} \cdot \frac{B_1}{B_2}$$

where $f_1$ exceeds 0.20, preferably exceeds 0.50, and $P_{mean}$ is at least 3 atmospheres absolute, preferably at least 7 atmospheres absolute.

According to the invention, it has been found that providing a cold gas refrigerator with a regenerator of the kind hereinbefore described, the chamber having a higher temperature being at a temperature which is equal to room temperature, permits achieving even an economically justified cold production, if the temperature of the chamber having a lower temperature is −200° C., this temperature being obtained at one stage.

According to an alternative embodiment of the invention, the regenerator loading mass is constituted by wire material. According to the invention it has been found that such regenerators are preferable from structural and thermotechnical considerations.

According to an alternative embodiment of the invention it is particularly desirable that with refrigerators for cooling at one stage from room temperature to temperatures lower than −100° C. the specific heat of the wire material at room temperature exceeds 0.6 gram cal./cc. ° C.

The invention will now be described in detail with reference to the accompanying drawing in which:

Figure 1 shows a graph plotting efficiency against reduced length of the regenerator.

Figure 2 diagrammatically shows a cold gas refrigerator according to the invention.

It is known that the efficiency of a regenerator depends on the value of the total thermal capacity. Regenerators are frequently calculated in practice on the basis of the Hausen's regenerator theory. This theory is published in "Zietschrift für angewandte Mathematik und Mechanik" 9, 173, 1929. Fig. 1 shows a diagram which can be derived in a simple manner from Fig. 13 of Hausen's article. For discussing the use of a regenerator in a cold gas refrigerator, this derived diagram can be better used than the diagram given by Hausen.

Plotted on the axis of the ordinates is the efficiency E of the regenerator and on the axis of the abscissae is the reduced length L of the regenerator, the efficiency E being understood to mean the heat which in one period is transmitted by the gas circulating through the regenerator to the regenerator loading mass divided by the maximum heat transmissible in this period. The reduced length L is to be understood to mean $$L = \alpha \frac{F}{W}$$

where $\alpha$ is the coefficient of the heat transmission of the

W medium to the regenerator loading mass in gram cal./cm.² sec. ° C. F is the total surface area of the regenerator loading mass in cm.² which enters into contact with the gas and W=the thermal capacity of the gas flowing in one direction per sec., in gram cal./sec. ° C. The values of the regenerator efficiency are plotted in the diagram for various values of the parameter G, where G=the reduced thermal capacity of the regenerator. This reduced thermal capacity is the quotient of the thermal capacity of the regenerator divided by the thermal capacity of the gas flowing in one direction through the regenerator, both expressed in gram cal./° C.

This diagram shows that although at a given L the efficiency of the regenerator first increases at an increase of the reduced thermal capacity G of the regenerator there is a limit at which an increase in reduced thermal capacity does substantially not involve an increase in efficiency of the regenerator. It also shows that for values of G equal to or greater than 2 almost the maximum efficiency at the particular value of L can be obtained. Thus, for example, for $L=40$ the increase in thermal capacity of the regenerator from $G=4$ to $G=\infty$ is only about 0.5%.

This regenerator theory is based on the assumption that apart from the beginning and the end of the period in which the gas flows in one direction, the gas is not subject to variations in pressure while it flows through the regenerator. According to the invention, it has now been found that if a regenerator is used in a cold gas refrigerator considerable differences in behaviour of the machine as a whole result due to particular effects which on investigation have been found to be due to the interaction between the cyclic process which takes place in the machine and the regenerator. They are partly due to the temperature fluctuations which occur locally in the regenerator and partly to the pressure fluctuations to which the gas is subjected while flowing in the regenerator. It has been surprising to find that if according to the invention a refrigerator comprises a regenerator which on the basis of the regenerator theory meets all requirements, a most considerable improvement in the cold production can be obtained if the thermal capacity per cc. is considerably increased. In this case the total thermal capacity of the regenerator may also be increased but it has been found that if this total thermal capacity is increased due to an increase of the total regenerator volume without increasing the thermal capacity per cc., no result is obtained.

Even with cold gas refrigerators which are constructed for a very low temperature the increase in thermal capacity per cc. permits of obtaining a considerable increase in cold production.

According to the invention, the conclusion was also arrived at that the value of the required thermal capacity $C_r$ of the regenerator is proportionally increased upon an increase in mean pressure of the cycle. According to the invention a regenerator having a comparatively low $C_r$ at a low mean pressure of the cycle (which also implies that the cold production of the refrigerator is low) may satisfy the dimensioning requirements of the machine, so that a reasonable cold production can be obtained at a given desired temperature level. If, however, with the same machine the mean pressure is increased in order to increase the cold production (since the latter is proportional to the mean pressure) the original cold production may decrease rather than increase and in extreme cases even the low temperature level obtained heretofore may no longer be reached.

With reference to the relationship, found in accordance with the invention, between the required thermal capacity on the one hand and the mean pressure and the proportioning of the machine on the other it is possible to calculate the correct regenerator at a given mean pressure for a given machine.

Fig. 2 shows a cylinder 1 containing a displacer 2 and a piston 3. Both the displacer 2 and the piston 3 are respectively linked to a common crank shaft 6 by piston rods 4 and 5 in such a manner that the displacer leads by a constant phase difference with respect to the piston, for example, 90°. The piston rod 4 of the displacer 2 reciprocates through a bore in piston 3. The space 7 above the displacer 2 is the chamber having a lower temperature, the so-called "freezing-chamber." This chamber is in communication with the chamber 11 between the displacer and the piston via a freezer 8, a regenerator 9 and a cooler 10. The chamber 11 is the chamber having a higher temperature. The refrigerator is driven, for example, by an electric motor (not shown). A cooling helix 12 is arranged to surround the freezer and is in communication with a heat exchanger 13 in a cooling chamber 14. This conduit system is filled with heat transmitting intermediate medium, for example pentane, which is circulated through the system by pump 15. The freezer and the freezing chamber are contained in the space 13 which must be kept at a low temperature, for example at −80° C. The regenerator is constructed in the form of a wire regenerator, the thermal capacity of which per cc. satisfies the requirement indicated hereinbefore. It is to be understood that the purpose of the invention is to produce cold at a low temperature. The cooling helix 12 and the heat exchanger 13 being adapted to cool the space 14 by the cold delivered from the freezer 8.

In order that the invention may be more clearly understood we subjoin a calculation example of a cold gas refrigerator which is required to cool at one stage from room temperature to −198° C. and to produce cold at this temperature. In this refrigerator the stroke volume of the chamber at a lower temperature is for example 80 ccs., the stroke volume of the chamber at a higher temperature is also 80 ccs., the gas volume of the freezer is 40 ccs., of the regenerator 64 ccs., and of the cooler 48 ccs., the communicating channels that may be present being allowed for. The temperature of the freezing chamber is −198° C. and the temperature of the chamber at higher temperature +27° C. The mean pressure is for example 10 atmospheres absolute.

For this machine the minimum requirements to be satisfied by the thermal capacity $C_r$ of the regenerator can be calculated.

The thermal capacity per cc. must exceed:

$$0.20 \cdot \frac{k}{k-1} \cdot \frac{P_{mean}}{T_w} \cdot \frac{B_1}{B_2} \cdot \frac{k}{k-1} = 3.06$$

if the working chamber of the machine is filled with hydrogen gas at a temperature of −86° C., which is the arithmetic mean of the absolute temperature of the chambers at a lower and at a higher temperature. Assuming the $T_w$ of the gas at a point at which this gas enters the chamber of lower temperature to be equal to the mean temperature of this chamber, $T_w = -198°$ C. or 75° Kelvin.

As indicated hereinbefore, $B_1$ is the mean total volume in respect of time of the chamber in which the thermal dynamic cyclic process takes place. This volume consists of the sum of the half-volumes of the chambers at a higher and at a lower temperature plus the volumes of the freezer, regenerator and cooler and any communication channels that may be present. $B_1$ is consequently equal to $$\frac{80+80}{2} + 40 + 64 + 48 = 232 \text{ ccs.}$$

$B_2$ is the mean total volume in respect of time of the space in which the thermodynamic cyclic process takes place, reduced to the temperature of the chamber at a higher temperature, "reducing a volume to a given temperature" being understood to mean calculating the volume which a gas mass contained in this volume would occupy if the temperature were equal to that temperature to which the volume is required to be reduced. Since the chamber at a higher temperature and the cooler are already at the temperature of the chamber at a higher temperature, there is no need for these volumes to be reduced. However, the regenerator, freezer and freezing chamber are at a lower temperature, so that they require a temperature reduction to be allowed for. For this purpose the volume of the regenerator is multiplied by the factor $$\frac{\tau ln \tau}{\tau - 1}$$

and the volumes of the freezer and the chamber at a lower temperature by $\tau$, the factor $\tau$ being the quotient of the temperature of the chamber at a higher temperature divided by the temperature of the chamber at a lower temperature both measured in degrees Kelvin. Thus, in the present case $\tau$ is equal to $$\frac{27+273}{273-198}=4$$

The factor $$\frac{\tau ln \tau}{\tau - 1} \text{ is } 1.84$$

Consequently, in a manner similar to $B_1$, $B_2$ is the sum of the half-volumes of the chambers at a higher and at a lower temperature, plus the volumes of the freezer, regenerator and cooler, all of them, however, being reduced to the temperature of the chamber at a higher temperature.

$$B_2 = \frac{80+4 \times 80}{2} + 4 \times 40 + 1.84 \times 64 + 48 = 521 \text{ ccs.}$$

Substituting these values for $C_r$ it is found that $C_3$ must be equal to or greater than $$0.20 \times 3.06 \times \frac{10}{75} \times \frac{232}{521} = 0.034 \text{ gram cal./ccs. } ° C.$$

However, according to the formula given above, $C_r$ must preferably be higher than or equal to $$\frac{0.50}{0.20} \times 0.034 = 0.085 \text{ gram cal./ccs. } ° C.$$

The calculation above given shows that, for example, a wadding regenerator having a thermal capacity of 0.014 gram. cal/ccs. ° C. which on the basis of the hitherto known regenerator theory were suitable for use in a refrigerator according to the invention, does not meet the particular requirements. The use in this machine of such a wadding regenerator would not ensure an economically justified cooling achievement.

It may be observed that in special cases the mean pressure in a refrigerator may be considerably higher than 10 atm. and may be, for example, 26 atm. From this it consequently follows that in this case the thermal capacity $C_r$ of the regenerator must be even considerably higher than in the above case calculated for a mean pressure of 10 atm. Thus, if the mean pressure in the above described machine is 25 atm., $C_r$ must be higher than:

$$2.5 \times 0.034 (=0.085) \text{ gram. cal./ccs. } ° C.$$

preferably greater than $$2.5 \times 0.085 (=0.212) \text{ gram. cal./ccs. } ° C.$$

The wire regenerators mentioned hereinbefore are constituted by wound wire having a diameter which in general is less than 0.5 mm., preferably, however, less than 0.1 mm. The wire may be wound according to a definite sample, such for example as a radio coil. However, it is also possible for the wire, after first being deformed, for example in a zig-zag fashion, to be simply wound. Although reference has been had hereinbefore to wire regenerators it is obvious that the invention can also be used with other types of regenerators.

What we claim is:

1. A cold gas refrigerator using a gas of invariable chemical composition which is subject to a closed thermodynamic cyclic process in which the gas is invariably in the same physical state comprising a cylinder, a crankshaft, a piston connected to said crankshaft, a displacer connected to said crankshaft but reciprocating at a constant phase difference with respect to said piston, said cylinder having two chambers formed therein, one on one side of said displacer and the other between said displacer and said piston, said chambers varying continuously in volume with a substantially constant relative phase difference, one of said chambers having a lower temperature and the other having a higher temperature, and means connecting said chambers, said means comprising a freezer, regenerator and a cooler connected in series, said regenerator having a thermal capacity per cc. which is equal to $$f \cdot \frac{k}{k-1} \cdot \frac{P_{mean}}{T_w} \cdot \frac{B_1}{B_2}$$

where $f$ exceeds 0.08 and ($P_{mean}$) is at least 3 atmospheres absolute.

2. A cold gas refrigerator using a gas of invariable chemical composition which is subject to a closed thermodynamic cyclic process in which the gas is invariably in the same physical state comprising a cylinder, a crankshaft, a piston connected to said crankshaft, a displacer connected to said crankshaft but reciprocating at a constant phase difference with respect to said piston, said cylinder having two chambers formed therein, one on one side of said displacer and the other between said displacer and said piston, said chambers varying continuously in volume with a substantially constant relative phase difference, one of said chambers having a temperature lower than $-100°$ C. and the other having a temperature approximately at room temperature, and means connecting said chambers, said means comprising a freezer, regenerator and a cooler, connected in series, said regenerator having a thermal capacity per cc. which is equal to $$f_1 \cdot \frac{k}{k-1} \cdot \frac{P_{mean}}{T_w} \cdot \frac{B_1}{B_2}$$

where $f$ exceeds 0.20 and ($P_{mean}$) is at least 3 atmospheres absolute.

3. A cold gas refrigerator using a gas of invariable chemical composition which is subject to a closed thermodynamic cyclic process in which the gas is invariably in the same physical state comprising a cylinder, a crankshaft, a piston connected to said crankshaft, a displacer connected to said crankshaft but reciprocating at a constant phase difference with respect to said piston, said cylinder having two chambers formed therein, one on one side of said displacer and the other between said displacer and said piston, said chambers varying continuously in volume with a substantially constant relative phase difference, one of said chambers having a lower temperature and the other having a higher temperature and means connecting said chambers, said means comprising a freezer, regenerator, and a cooler connected in series, said regenerator having a filler of wire material and also having a thermal capacity per cc. which is equal to $$f \cdot \frac{k}{k-1} \cdot \frac{P_{mean}}{T_w} \cdot \frac{B_1}{B_2}$$

where $f$ exceeds 0.08 and ($P_{mean}$) is at least 3 atmospheres absolute.

4. A cold gas refrigerator using a gas of invariable chemical composition which is subject to a closed thermodynamic cyclic process in which the gas is invariably in the same physical state comprising a cylinder, a crankshaft, a piston connected to said crankshaft, a displacer connected to said crankshaft but reciprocating at a constant phase difference with respect to said piston, said cylinder having two chambers formed therein, one on one side of said displacer and the other between said displacer and said piston, said chambers varying continuously in volume with a substantially constant relative phase difference, one of said chambers having a temperature lower than $-100°$ C. and the other having a higher temperature approximately at room temperature, and means connecting said chambers, said means comprising a freezer, regenerator and a cooler connected in series, said regenerator having a filler of wire material which has a specific heat at room temperature exceeding 0.6 gram cal./ccs. ° C. and said regenerator also having a thermal capacity per cc. which is equal to $$f \cdot \frac{k}{k-1} \cdot \frac{P_{mean}}{T_w} \cdot \frac{B_1}{B_2}$$

where $f$ exceeds 0.08 and ($P_{mean}$) is at least 3 atmospheres absolute.

5. A cold gas refrigerator using a gas of invariable chemical composition which is subject to a closed thermodynamic cyclic process in which the gas is invariably in the same physical state comprising; at least one cylinder, a crankshaft, at least one piston in said cylinder connected to said crankshaft, said cylinder having a chamber on one side of said piston with a relatively low temperature and a chamber on another side of said piston having a temperature higher than said first chamber, said chambers varying continuously in volume, and means connecting a chamber of relatively low temperature with a chamber of relatively high temperature, said means comprising a freezer, regenerator and a cooler connected in series, said regenerator having a thermal capacity per cc. which is equal to $$f \cdot \frac{k}{k-1} \cdot \frac{P_{mean}}{T_w} \cdot \frac{B_1}{B_2}$$

where $f$ exceeds 0.08 and $P_{mean}$ is at least 3 atmospheres absolute.

References Cited in the file of this patent
UNITED STATES PATENTS

| | | |
|---|---|---|
| 2,484,392 | Van Heeckeran | Oct. 11, 1949 |
| 2,486,081 | Van Weenen | Oct. 25, 1949 |